United States Patent
Cruz-Aguilar et al.

(10) Patent No.: US 10,764,144 B2
(45) Date of Patent: Sep. 1, 2020

(54) HANDLING A SPLIT WITHIN A CLUSTERED ENVIRONMENT

(71) Applicant: International Business Machines Corporation, Armonk, NY (US)

(72) Inventors: Esdras E. Cruz-Aguilar, Round Rock, TX (US); Perinkulam I. Ganesh, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 15/292,326

(22) Filed: Oct. 13, 2016

(65) Prior Publication Data
US 2018/0109420 A1    Apr. 19, 2018

(51) Int. Cl.
*H04L 12/24*    (2006.01)
*H04L 12/26*    (2006.01)

(52) U.S. Cl.
CPC .......... *H04L 41/12* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 6,438,705 B1* | 8/2002 | Chao | ................... | G06F 11/1425 714/4.11 |
| 7,464,378 B1* | 12/2008 | Limaye | ................. | G06F 9/5061 714/100 |
| 7,843,811 B2* | 11/2010 | Armstrong | .......... | G06F 11/0709 370/221 |
| 2010/0174417 A1* | 7/2010 | Iida | ......................... | H02J 9/061 700/292 |
| 2011/0283149 A1* | 11/2011 | Richmond | .......... | G06F 11/3006 714/39 |
| 2015/0143157 A1* | 5/2015 | Chen | ....................... | H04L 69/40 714/4.3 |
| 2015/0317224 A1* | 11/2015 | Cho | ....................... | G06F 3/0619 714/6.3 |

OTHER PUBLICATIONS

Cruz-Aguilar, et al., Pending U.S. Appl. No. 15/292,322 Entitled "Enhanced and Concurrent Asymmetric Topology Reconciliation in a Computer Cluster" filed Oct. 13, 2016.
List of IBM Patents or Patent Applications Treated as Related (Appendix P), Filed Jan. 23, 2017, 2 pages.

(Continued)

*Primary Examiner* — Younes Naji
(74) *Attorney, Agent, or Firm* — Cantor Colburn LLP; David Quinn (57) ABSTRACT

Aspects of the present invention include a method, system and computer program product for handling a split condition within a computer cluster configuration. The method includes determining by a processor of a node, for each of a number of other nodes within a plurality of nodes whether each of the number of other nodes is in a DOWN state or an UP state; adding each node that is an UP state to a list of nodes that are in an UP state; adding each node that is a DOWN state to a list of nodes that are in a DOWN state; and generating a split event having two islands.

15 Claims, 5 Drawing Sheets

(56) References Cited

OTHER PUBLICATIONS

Daily From Sachith "Asymmetric clustering vs Symmetric clustering", retrieved from: http://dailyfromsachith.blogspot.com/2013/01/asymmetric-clustering-vs-symmetric.html; Jan. 16, 2013; 2 pgs.

Ding, Chris et al. "Cluster merging and splitting in hierarchical clustering algorithms", retrieved from: http://citeseerx.ist.psu.edu/viewdoc/download?doi=10.1.1.76.3449&rep=rep1&type=pdf; downloaded Dec. 30, 2019; 8 pgs.

Galera Cluster "The Primary Component in Galera Cluster", retrieved from: https://galeracluster.com/2015/08/the-primary-component-in-galera-cluster/; Aug. 25, 2015; 4 pgs.

Karanikolaou, E. M. et al. A load balancing fault-tolerant algorithm for heterogeneous cluster environments: https://www.researchgate.net/publication/262290086; Article in Neural, Parallel and Scientific Computations—Mar. 2009; 16 pgs.

Savaresi, Sergio, M. et al. "Choosing the cluster to split in bisecting divisive clustering algorithms", retrieved from: http://www-users.cs.umn.edu/~boley/publications/papers/SIAM_Choose.pdf; retrieved Dec. 30, 2019; 16 pgs.

wikidot.com "Operating Systems Principles—Asymmetric Clustering", retrieved from: http://operatingsystemsprinciples.wikidot.com/asymmetric-clustering; last edited: Jun. 18, 2008; 1 pg.

\* cited by examiner

HANDLING A SPLIT WITHIN A CLUSTERED ENVIRONMENT

BACKGROUND

The present invention relates to multiple computers connected together in a cluster configuration, and more specifically, to a method, system and computer program product for handling a split condition within a computer cluster configuration.

In the field of computer processing, it is known to connect together a plurality of computers in a cluster having a certain configuration or topology. Each computer within a cluster is typically referred to as a node. This cluster configuration is utilized in part to divide software processing tasks among the computers in the cluster, which leads to improvements in efficiency in completing the oftentimes complex software processing tasks.

A common cluster configuration or topology is a symmetric one in which the various nodes are all connected to each other and to other devices such as, for example, a data storage device or repository. In addition, for redundancy purposes, the nodes may be connected together using more than one connection scheme, including using different types of wired or wireless mediums or protocols such as, for example, Ethernet, TCP/IP, TCP, a storage area network (SAN), a local area network (LAN), a wide area network (WAN), a data information service center (DISK.), or a direct connection.

Nodes within a cluster commonly use "heartbeats" to communicate with each other on a regular basis (e.g., twice per second). This allows the node sending the heartbeat signal to determine if one or more receiving nodes, including the communication interfaces of the nodes and the communication medium(s) or protocol(s) between the nodes, are functioning properly. Often, a "gossip" heartbeat may be communicated which includes not only information about the sending or transmitting node (e.g., that it is active), but also includes information that the sending node has received from other nodes indicating, for example, which of the other nodes are available and the topology sensed by each of the other nodes, i.e., which of the other nodes each other node thinks are available.

Although transmitting heartbeats over multiple interfaces may improve reliability, a partial loss of connectivity between one or more nodes to other nodes within the cluster may cause asymmetric topological views among the nodes, i.e., different nodes may have different views of which other nodes are connected and functioning. Asymmetric topologies may lead to cluster inoperability issues. For example, cluster-wide locks may be erroneously granted, thereby leading to repository corruption and confusion among upper network layers.

SUMMARY

According to one or more embodiments of the present invention, a computer-implemented method includes determining, by a processor of a node, for each of a number of other nodes within a plurality of nodes whether each of the number of other nodes is in a DOWN state or an UP state; adding, by the processor, each node that is an UP state to a list of nodes that are in an UP state; adding, by the processor, each node that is a DOWN state to a list of nodes that are in a DOWN state; and generating, by the processor, a split event having two islands.

According to another embodiment of the present invention, a system includes a processor of a node in communication with one or more types of memory, the processor configured to determine for each of a number of other nodes within a plurality of nodes that each node whether each of the number of other nodes is in a DOWN state or an UP state; to add each node that is an UP state to a list of nodes that are in an UP state; to add each node that is a DOWN state to a list of nodes that are in a DOWN state; and to generate a split event having two islands.

According to yet another embodiment of the present invention, a computer program product includes a non-transitory storage medium readable by a processing circuit and storing instructions for execution by the processing circuit for performing a method that includes determining for each of a number of other nodes within a plurality of nodes whether each of the number of other nodes is in a DOWN state or an UP state; adding each node that is an UP state to a list of nodes that are in an UP state; adding each node that is a DOWN state to a list of nodes that are in a DOWN state; and generating a split event having two islands.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
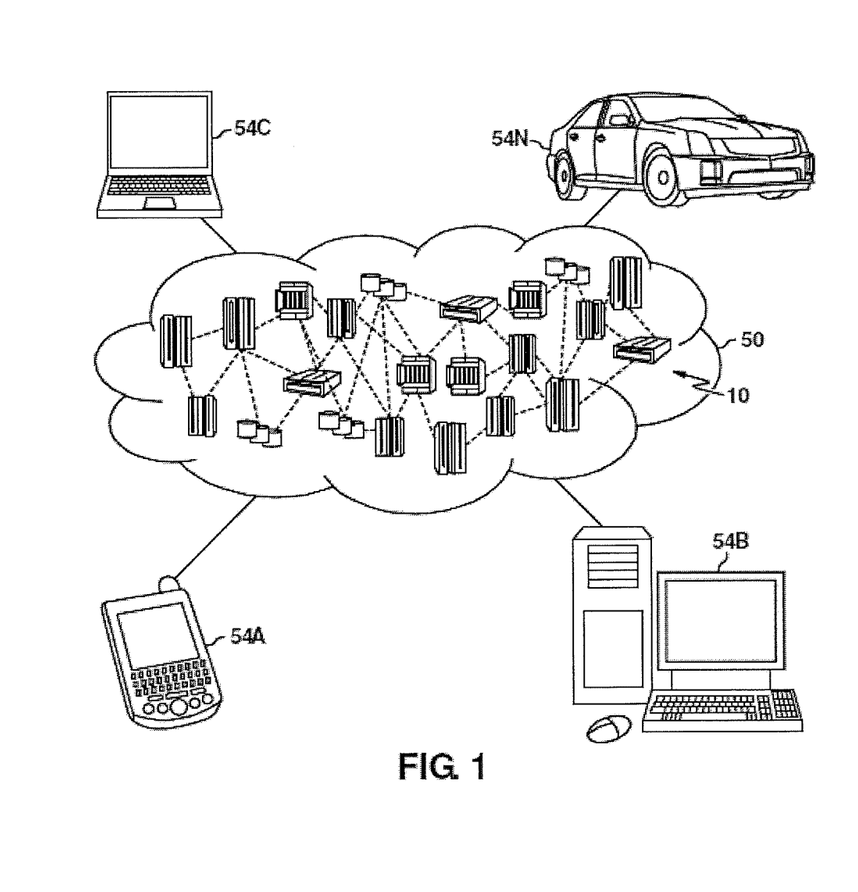
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
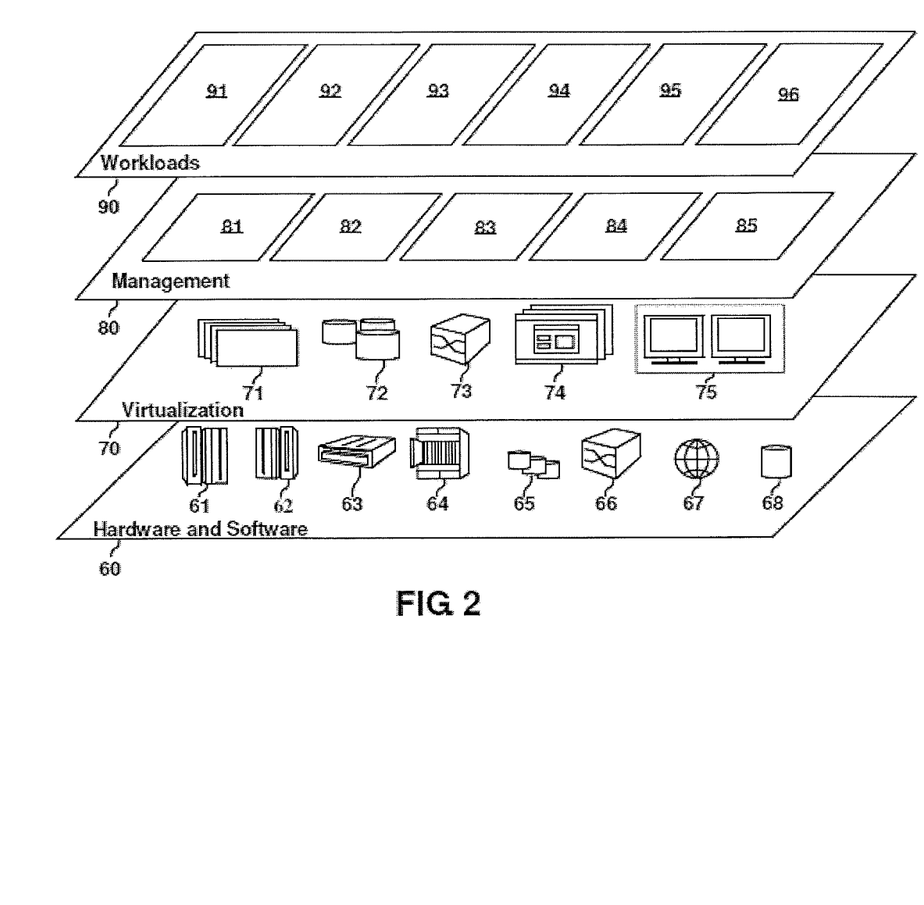
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for handling a split condition within a computer cluster configuration in accordance with one or more embodiments of the present invention.

In accordance with one or more embodiments of the present invention, methods, systems, and computer program products are disclosed for handling a split condition within a computer cluster configuration.

Figure 3:
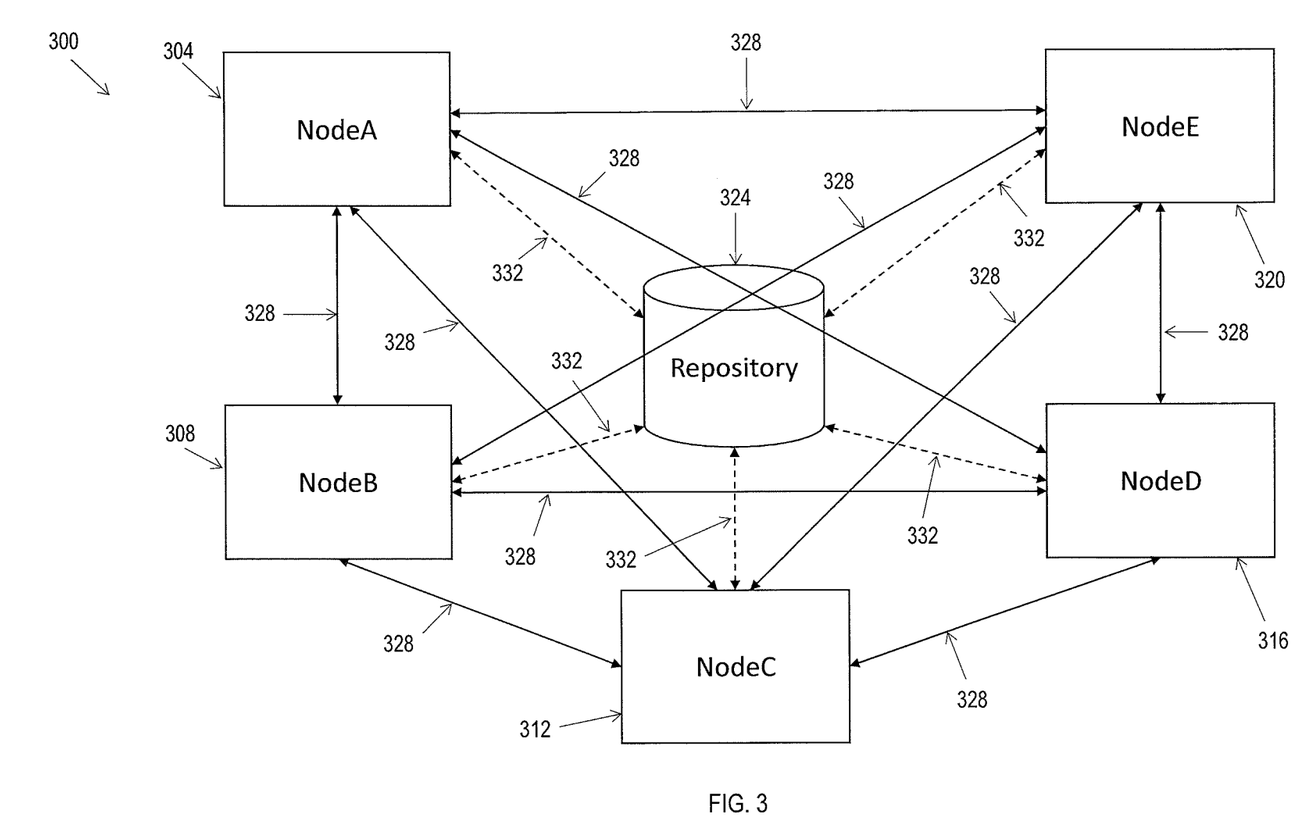
FIG. 3 is a block diagram of a multiple of computers connected in a cluster that is in a symmetrical condition according to one or more embodiments of the present invention.

Referring to FIG. 3, there illustrated is a block diagram of a multiple or plurality of computers or nodes (Node A-Node E) 304-320 connected in a cluster configuration or topology 300 that is in a symmetrical condition, according to one or more embodiments of the present invention. Although not shown, each of the computers 304-320 may comprise known components, such as, for example, a processor or processing unit, a memory, a monitor, a keyboard, a mouse, etc. Each of the computers 304-320 may reside or be a part of the cloud computing environment 50 described hereinabove and illustrated in FIGS. 1 and 2, or may comprise some other type of computer environment.

Also illustrated in FIG. 3 is a centralized data storage device or repository 324 that may be shared among each of the computers 304-320 in the cluster 300. The repository 324 may be used to store data and/or information of various types for access by each of the computers or nodes 304-320. The repository 324 is not required in the broadest scope of embodiments of the present invention. Also, more or less than five computers or nodes 304-320 may be connected in a cluster configuration in other embodiments of the present invention. In the discussion herein, it is to be understood that the five computers 304-320 within the cluster configuration 300 shown in FIG. 3 merely represents an exemplary embodiment.

All five of the computers (Node A-Node E) 304-320 and the repository 324 shown in FIG. 3 may be connected together in a symmetrical configuration or topology. In an exemplary embodiment, the computers 304-320 may be connected to each other by way of network connections or interfaces, as shown in FIG. 3 by the solid lines 328. Also in this exemplary embodiment, each of the computers 304-320 may be connected to the repository by way of a DISK connection or interface, as shown in FIG. 3 by the dashed lines 332. As mentioned above, other types of connection mediums, protocols or interfaces may be utilized in light of the teachings herein. These include, for example, Ethernet, TCP/IP, TCP, a storage area network (SAN), a local area network (LAN), a wide area network (WAN), a data information service center (DISK.), or a direct connection.

Figure 4:
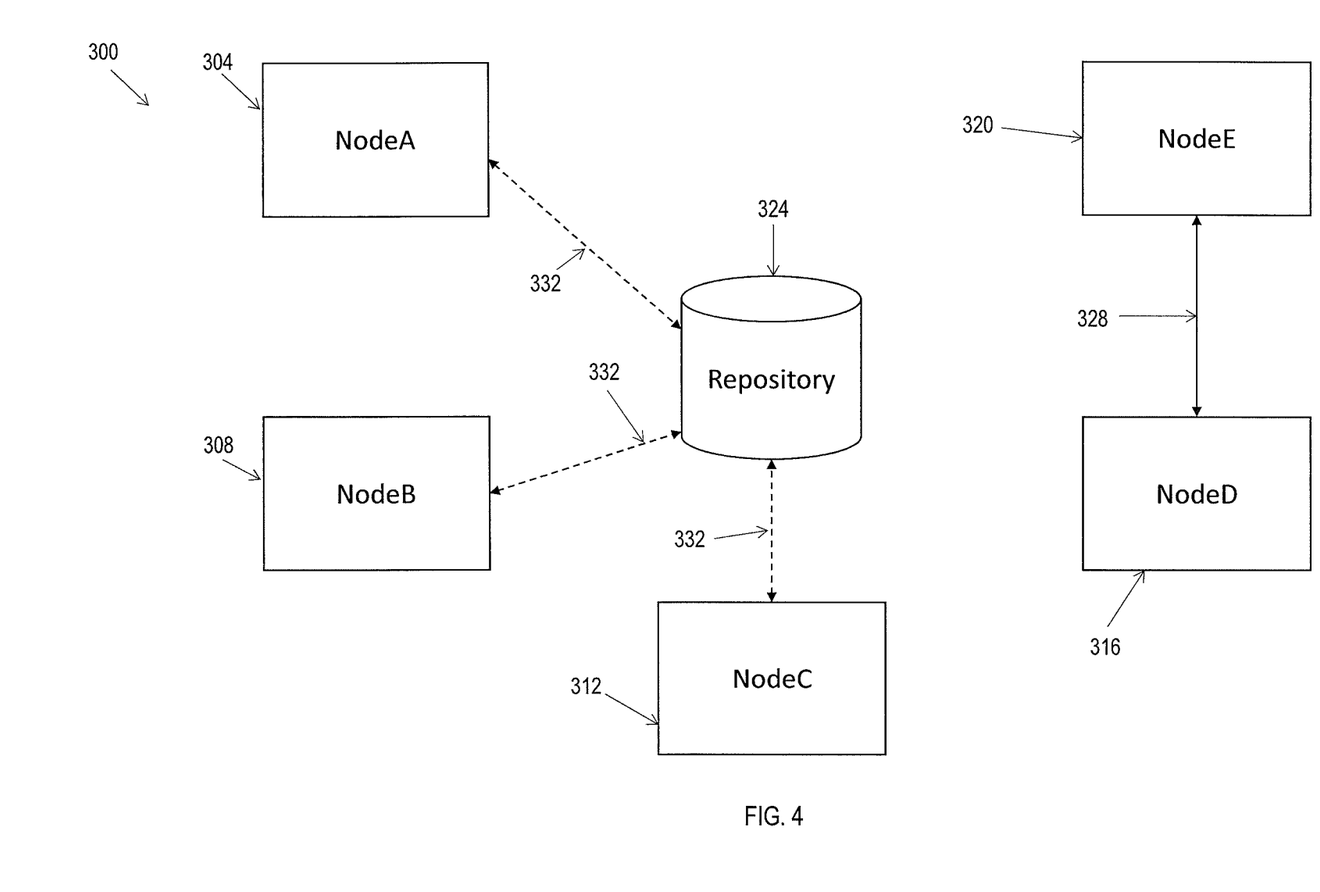
FIG. 4 is a block diagram of the multiple of computers of FIG. 3 connected in a cluster that is in a split condition according to one or more embodiments of the present invention.

Referring now to FIG. 4, there illustrated is a block diagram of the multiple or plurality of computers 304-320 and the repository 324 of FIG. 3 connected in a cluster configuration or topology that is in an asymmetrical or split condition according to one or more embodiments of the present invention. It should be noted that FIG. 4 and the corresponding discussion herein represents just one example of a split condition of a cluster configuration 300 of a plurality of computers 304-312 and a repository 324. Other split conditions are possible.

In the embodiment shown in FIG. 4, as compared to FIG. 3, the only remaining communication connections between the various nodes 304-320 and the repository 324 are the DISK connections 332 between the repository 324 and each of Node A 304, Node B 308 and Node C 312. Also, there is still one network connection 328 between Node D 316 and Node E 320. Thus, Node A 304, Node B 308 and Node C 312 has each lost its network connection 328 with the other nodes 304-320, while Node D 316 and Node E 320 has each lost its DISK connection 332 with the repository 324.

As a result, Node A 304, Node B 308 and Node C 312 cannot communicate or gossip with Node D 316 and Node E 320. Thus, in this split condition within the cluster configuration 300, two islands have been formed: a first island that comprises Node A 304, Node B 308 and Node C 312; and a second island that comprises Node D 316 and Node E 320. In general, an island is an inconsistent view of one partition within the cluster 300 from the other partition within the cluster 300. A split cluster (unlike merge) is relatively more prone to data corruption. It is because nodes in each island would presume another node in the remote island is DOWN and as a result may take over the task of a node in the remote islands, this may result in multiple nodes concurrently accessing a common resource such as a database without the knowledge of other. This would corrupt the common resource. Race conditions may also occur within each island.

Thus, when a split condition within a cluster does occur, each island should have one clean consistent view of the other island to better manage the split. It would be beneficial if a split event generated in each side (i.e., each island) contains a perceived list of the nodes in the other or remote island and a perceived list of nodes in the same or local island. In embodiments of the present invention, the split event may include not just the node being marked down but also the list of nodes which are likely going to be affected by the split. Since this a prediction, the active nodes have to speculate.

Figure 5:
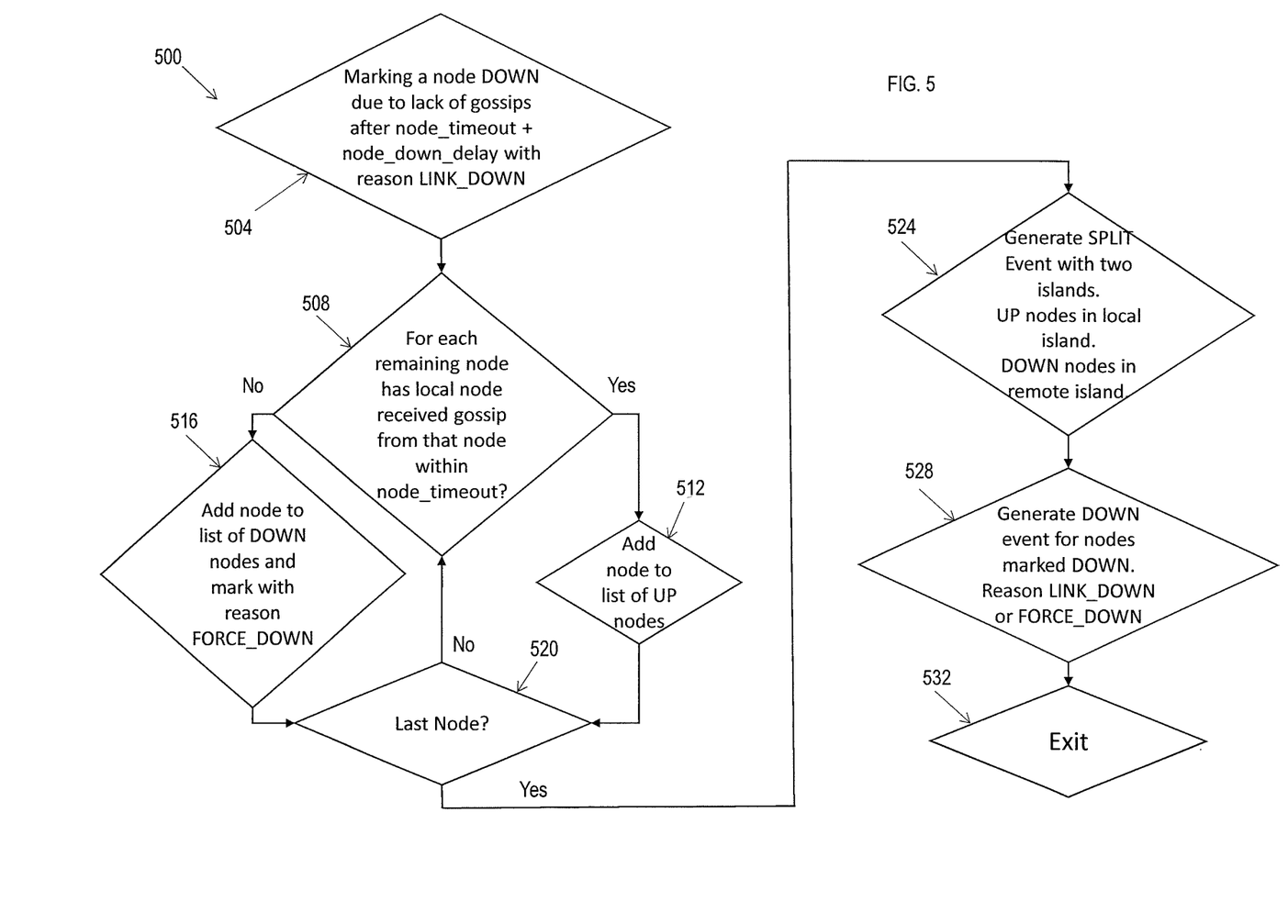
FIG. 5 is a flow diagram of a method for handling a split condition within a computer cluster configuration in accordance with one or more embodiments of the present invention.

With reference now to FIG. 5, a flow diagram illustrates a method 500 according to one or more embodiments of the present invention for handling a split condition in a cluster 300 of computers 304-320, in accordance with one or more embodiments of the present invention. In embodiments, the method 500 may be embodied in software that is executed by computer elements located within a network that may reside in the cloud, such as the cloud computing environment 50 described hereinabove and illustrated in FIGS. 1 and 2.

More specifically, the method 500 of FIG. 5 may be implemented and operated simultaneously on each of the computers or nodes 304-320 of FIGS. 3 and 4. Each computer or node 304-320 may be "triggered" or prompted to run the method 500 only when a split condition with the cluster 300 is detected or is otherwise in existence. In the alternative, each node 304-320 may run the method 500 all the time, or may run the method 500 upon the occurrence of a certain event.

In the method 500, when one of the nodes 304-320 marks another node as being DOWN, the node does not do so abruptly. Instead, the node marks the other node DOWN after a time period given by the variable node_timeout plus the variable node_down_delay. The latter is a jitter factor. In an exemplary embodiment, the node_timeout is 20 seconds and the node_down_delay is 10 seconds. Thus, the total time period is 30 seconds. However, these numbers are purely exemplary. Other numbers of seconds may be utilized for these two variables.

After entering the method 500 of FIG. 5, an operation in block 504 starts when the local node (e.g., Node A 304) is marking another node (e.g., Node D 316) as being DOWN if there is no gossip or communications coming from that node 316 within the 30 second total time period. Also, the operation in block 504 may also give a reason (LINK_DOWN) for why Node D 316 was marked DOWN (e.g., no gossip from Node D for 30 seconds). Each of the other nodes 308-320 in the cluster 300 may do the same thing with respect to itself and connections to other nodes 308-320.

In an operation in block 508, Node A 304 checks each of the remaining nodes (i.e., Node B 308, Node C 312 and Node E 320) iteratively to see if Node A 304 (i.e., the local node in this example) has received any gossip from each of the remaining nodes within a time period given by the variable node_timeout, or 20 seconds. If Node A 304 has received gossip from any of the remaining nodes 308-320 within the node_timeout period of 20 seconds, then that node(s) is added to a list of UP nodes in an operation in block 512. Instead, if Node A 304 has not received any gossip from any of the remaining nodes 308-320 within the node_timeout period of 20 seconds, then that node(s) is added to a list of DOWN nodes in an operation in block 516. Node A 304 may mark those DOWN nodes as forcefully down or FORCE_DOWN to indicate that those nodes were forcefully brought DOWN.

After each operation in block 512 or 516, an operation in block 520 checks if the last one of the nodes 304-320 has been considered in the iteration of the operations in blocks 508, 512 and 516. If not, then the method 500 branches back to the operation in block 508 to iteratively consider each of the remaining nodes 304-320. If so, then the method 500 branches to operation in block 524 which generates a split event or condition in which the nodes 304-320 being determined to be UP in the operation in block 512 are placed in a local island, and the nodes 304-320 being determined to be DOWN in the operation in block 516 are placed in a remote island.

An operation in block 528 generates DOWN events for the one or more nodes 304-320 that were marked as being DOWN in the operation in block 516. It also gives the reason for the nodes 304-320 being marked DOWN—i.e., either LINK_DOWN in the operation in block 504 or FORCE_DOWN in the operation in block 516. The method 500 then exits in an operation in block 532.

As an example of the foregoing, consider a five node single site cluster 300 (FIGS. 3 and 4) with Node A 304, Node B 308, Node C 312, Node D 316 and Node E 320. Now, if Node C 312 loses connectivity to Node D 316 (after a node_timeout and node_down_delay totaling 30 seconds), then Node C 312 will go through the list of nodes 304-320 and see from whom it has not received any gossip for the last node_timeout interval of 20 seconds. If Node C 312 finds any such nodes 304-320, then Node C 312 will include those nodes as potential candidates and include them in the list of DOWN nodes in the operation in block 516.

One reason is that Node D 316 and some of the other nodes 304-320 are attached to the cluster 300 through a common link. Since connectivity to Node D 316 was lost during the loss of link, there is a good possibility that the other nodes would also be soon marked DOWN.

Now suppose Node E 320 happens to be such a node. The Method 500 of embodiments of the present invention will declare a SPLIT event or condition with Node D 316 and Node E 320 in the remote island and Node A 304, Node B 308 and Node C 312 in the local island, as seen by Node C 312.

Once Node D 316 and Node E 320 have been marked DOWN, they will not be allowed to JOIN the cluster automatically by Node C 312, even though Node C 312 may receive a heartbeat from Node D 316 and/or Node E 320 at a later point of time. Instead, Node D 316 and Node E 320 would have to be recycled, that is rebooted or STOPPED and STARTED.

Node D 316 may run the method 500 of FIG. 5 as well, but not necessarily at the same time as Node C's running of the method 500. Since the nodes 304-320 exchange heartbeat communications once every second in an exemplary embodiment, Node D 316 will be able to clearly figure out which nodes 304-320 are in the remote island within a few seconds.

The nodes in the remote island are basically the number of nodes which were not gossiping for the last node_timeout interval or more and therefore have been flagged FLAG_LINK_DOWN. Nodes which are in the DOWN state with no flag set or STOPPED are not taken into account.

Once a split event has been generated, one must ensure that the resource takeover would occur before it is released. It is handled as follows by determining the winning and the losing side. Normally the winning side is the side which has a higher number of nodes in the UP state. If the number of nodes on each side is the same, the winning side is the side with the node 304-320, e.g., with the lowest short id.

Note that because an island has a clear picture of the split, the island can make unanimous decisions even while isolated. If the winning side happens to currently hold the resource no further action is needed. The losing side will release the resource or will reboot itself immediately. The winning side will wait twice the node_timeout plus the node_down_delay (here, 60 seconds) before acquiring resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a processor of a first node, for each of a number of other nodes within a plurality of nodes whether each of the number of other nodes is in a DOWN state or an UP state;
   adding, by the processor, each node that is an UP state to a list of nodes that are in an UP state;
   adding, by the processor, each node that is a DOWN state to a list of nodes that are in a DOWN state;
   generating, by the processor, a split event and dividing the plurality of nodes having an UP state into two islands, wherein each of the plurality of nodes having an UP state that are within each island are able to communicate with one another;
   identifying a first of the two islands as a winning island and a second of the two islands as a losing island; and
   instructing nodes in the losing island to release ownership of a resources shared with nodes in the winning island,
   wherein the identifying of the winning island and the losing island includes:
      determining whether the two islands have an equal number of nodes that are in an UP state;
      in response to a determination that the two islands have an equal number of nodes in an UP state;
      identifying the first of the two islands as being the winning island if the first island has an UP state node having a lowest short ID among nodes in an UP state of the two islands and identifying the second of the two islands as being the losing island; and
      identifying the second of the two islands as being the winning island if the second island has an UP state node having the lowest short ID among nodes in an UP state of the two islands and identifying the first of the two islands as being the losing island; and
      in response to a determination that the two islands do not have equal number of nodes in an UP state:
      identifying the first of the two islands as being the winning island if the first island has a larger number of nodes in an UP state as compared to the second island and identifying the second of the two islands as being the losing island; and
      identifying the second of the two islands as being the winning island if the second island has a larger number of nodes in an UP state as compared to the first island and identifying the second of the two islands as being the losing island.

2. The computer-implemented method of claim 1 wherein a DOWN state is a state in which no communications are possible from a node which is in a DOWN state.

3. The computer-implemented method of claim 1 further comprising determining, by a processor of a second node, that the first node is in a DOWN state by determining, by the processor of the second node, that the first node is in a DOWN state after a first period of time in which no communications comes from the first node.

4. The computer-implemented method of claim 3 wherein determining, by the processor of the first node, for each of the number of other nodes within the plurality of nodes whether each of the number of other nodes is in a DOWN state or an UP state comprises determining, by the processor of the first node, for each of the number of other nodes within the plurality of nodes whether each of the number of other nodes is in a DOWN state or an UP state after a second period of time.

5. The computer-implemented method of claim 4 wherein the second period of time is shorter than the first period of time.

6. A system comprising:
   a processor of a first node in communication with one or more types of memory, the processor configured to:
   determine for each of a number of other nodes within a plurality of nodes that each node whether each of the number of other nodes is in a DOWN state or an UP state;
   add each node that is an UP state to a list of nodes that are in an UP state; add each node that is a DOWN state to a list of nodes that are in a DOWN state; and
   generate a split event and divide the plurality of nodes having an UP state into two islands, wherein each of the plurality of nodes having an UP state that are within each island are able to communicate with one another;
   identify a first of the two islands as a winning island and a second of the two islands as a losing island; and
   instruct nodes in the losing island to release ownership of a resources shared with nodes in the winning island,
   wherein the identifying of the winning island and the losing island includes by the processor of the first node includes:
      determining whether the two islands have an equal number of nodes that are in an UP state;
      in response to a determination that the two islands have an equal number of nodes in an UP state:
         identifying the first of the two islands as being the winning island if the first island has an UP state node having a lowest short ID among nodes in an UP state of the two islands and identifying the second of the two islands as being the losing island, and
         identifying the second of the two islands as being the winning island if the second island has an UP state node having the lowest short ID among nodes in an UP state of the two islands and identifying the first of the two islands as being the losing island; and
      in response to a determination that the two islands do not have equal number of nodes in an UP state:
         identifying the first of the two islands as being the winning island if the first island has a larger number of nodes in an UP state as compared to the second island and identifying the second of the two islands as being the losing island; and identifying the second of the two islands as being the winning island if the second island has a larger number of nodes in an UP state as compared to the first island and identifying the second of the two islands as being the losing island.

7. The system of claim 6 wherein a DOWN state is a state in which no communications are possible from a DOWN state.

8. The system of claim 6 further comprising a processor of a second node, wherein the processor of the second node is configured to determine that the first node is in a DOWN state by determining that the first node is in a DOWN state after a first period of time in which no communications comes from the first node.

9. The system of claim 8 wherein the processor of the first node configured to determine for each of the number of other nodes within the plurality of nodes whether each of the number of other nodes is in a DOWN state or an UP state comprises the processor of the first node being configured to determine for each of the number of other nodes within the plurality of nodes whether each of the number of other nodes is in a DOWN state or an UP state after a second period of time.

10. The system of claim 9 wherein the second period of time is shorter than the first period of time.

11. A computer program product comprising:
a non-transitory storage medium readable by a processing circuit of a first node and storing instructions for execution by the processing circuit for performing a method comprising:
determining for each of a number of other nodes within a plurality of nodes that each node whether each of the number of other nodes is in a DOWN state or an UP state;
adding each node that is an UP state to a list of nodes that are in an UP state;
adding each node that is a DOWN state to a list of nodes that are in a DOWN state; and
generating a split event and dividing the plurality of nodes having an UP state into two islands, wherein each of the plurality of nodes having an UP state that are within each island are able to communicate with one another;
identifying a first of the two islands as a winning island and a second of the two islands as a losing island; and
instructing nodes in the losing island to release ownership of a resources shared with nodes in the winning island,
wherein the identifying of the winning island and the losing island includes:
determining whether the two islands have an equal number of nodes that are in an UP state;

in response to a determination that the two islands have an equal number of nodes in an UP state:
identifying the first of the two islands as being the winning island if the first island has an UP state node having a lowest short ID among nodes in an UP state of the two islands and identifying the second of the two islands as being the losing island; and
identifying the second of the two islands as being the winning island if the second island has an UP state node having the lowest short ID among nodes in an UP state of the two islands and identifying the first of the two islands as being the losing island; and
in response to a determination that the two islands do not have equal number of nodes in an UP state:
identifying the first of the two islands as being the winning island if the first island has a larger number of nodes in an UP state as compared to the second island and
identifying the second of the two islands as being the losing island;
and identifying the second of the two islands as being the winning island if the second island has a larger number of nodes in an UP state as compared to the first island and identifying the second of the two islands as being the losing island.

12. The computer program product of claim 11 wherein a DOWN state is a state in which no communications are possible from a node which is in a DOWN state.

13. The computer program product of claim 11 wherein the method further comprises determining, by a processing circuit of a second node, that the first node is in a DOWN state by determining, by the processing circuit of the second node, that the first node is in a DOWN state after a first period of time in which no communications comes from the first node.

14. The computer program product of claim 13 wherein determining, by the processing circuit of the first node, for each of the number of other nodes within the plurality of nodes that each node whether each of the number of other nodes is in a DOWN state or an UP state comprises determining, by the processing circuit of the first node, for each of the number of other nodes within the plurality of nodes that each node whether each of the number of other nodes is in a DOWN state or an UP state after a second period of time.

15. The computer program product of claim 14 wherein the second period of time is shorter than the first period of time.

* * * * *